United States Patent
Winkler et al.

(10) Patent No.: US 9,702,330 B2
(45) Date of Patent: Jul. 11, 2017

(54) VEHICLE HAVING A BELT PULLEY AND STANDSTILL AIR-CONDITIONING

(71) Applicant: Schaeffler Technologies AG & Co. KG, Herzogenaurach (DE)

(72) Inventors: Thomas Winkler, Offenburg (DE); Mathias Goeckler, Ottersweier (DE); Juergen Kroll, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/908,807

(22) PCT Filed: Jul. 23, 2014

(86) PCT No.: PCT/DE2014/200341
§ 371 (c)(1),
(2) Date: Jan. 29, 2016

(87) PCT Pub. No.: WO2015/014361
PCT Pub. Date: Feb. 5, 2015

(65) Prior Publication Data
US 2016/0169184 A1 Jun. 16, 2016

(30) Foreign Application Priority Data

Jul. 31, 2013 (DE) .................. 10 2013 214 970
Oct. 24, 2013 (DE) .................. 10 2013 221 646

(51) Int. Cl.
*F02N 11/04* (2006.01)
*H02K 23/52* (2006.01)
(Continued)

(52) U.S. Cl.
CPC ......... *F02N 11/003* (2013.01); *B60H 1/0045* (2013.01); *B60H 1/00778* (2013.01);
(Continued)

(58) Field of Classification Search
USPC ................... 290/31, 38 B; 701/22; 474/87
See application file for complete search history.

(56) References Cited

U.S. PATENT DOCUMENTS 6,190,282 B1 * 2/2001 Deguchi ............. B60K 6/442
180/65.23
7,520,353 B2 * 4/2009 Severinsky ........... B60H 1/004
180/65.265

(Continued)

FOREIGN PATENT DOCUMENTS

DE 102012208318 12/2012
DE 102011081121 2/2013

*Primary Examiner* — Pedro J Cuevas
(74) *Attorney, Agent, or Firm* — Simpson & Simpson, PLLC

(57) ABSTRACT

A vehicle including a combustion engine, a belt alternator starter, and a decouplable accessory power take-off for auxiliary units, wherein the accessory power take-off includes, as auxiliary units, at least an air-conditioning compressor and an electric motor as belt alternator starter that is usable as a motor and as a generator, wherein a coupling and a decoupling of the accessory power take-off occurs by means of a form-fitting clutch, and wherein at a standstill of the combustion engine during a short stop phase, a stationary air-conditioning operation occurs by means of a reverse rotation of the auxiliary units, and wherein a starting of the combustion engine after the short stop phase occurs by means of a reversal of the direction of rotation of the electric motor.

11 Claims, 5 Drawing Sheets

(51) Int. Cl.
*H02P 9/04* (2006.01)
*F02N 11/00* (2006.01)
*B60H 1/00* (2006.01)
*B60H 1/32* (2006.01)
*F02N 11/08* (2006.01)
*F16H 7/08* (2006.01)
*F02N 5/04* (2006.01)
*F02B 67/06* (2006.01)
*F16D 41/16* (2006.01)
*F02N 15/02* (2006.01)

(52) U.S. Cl.
CPC ........... *B60H 1/3222* (2013.01); *F02N 11/04* (2013.01); *F02N 11/0814* (2013.01); *F02N 11/0851* (2013.01); *F16H 7/0827* (2013.01); *F02B 67/06* (2013.01); *F02N 11/084* (2013.01); *F02N 15/023* (2013.01); *F02N 2200/0806* (2013.01); *Y16D 41/16* (2013.01); *Y02T 10/48* (2013.01)

(56) References Cited

U.S. PATENT DOCUMENTS

| | | | | |
|---|---|---|---|---|
| 8,006,819 B2* | 8/2011 | Dell | ............. | F16D 41/206 192/104 C |
| 8,214,097 B2* | 7/2012 | Severinsky | ............. | B60H 1/004 180/65.21 |
| 8,452,469 B2* | 5/2013 | Otokawa | ............. | B60K 6/365 701/111 |
| 8,630,761 B2* | 1/2014 | Severinsky | ............. | B60H 1/004 318/139 |
| 8,761,981 B2* | 6/2014 | Hussain | ............. | B60W 20/00 180/65.265 |
| 8,863,485 B2* | 10/2014 | Pitcel | ............. | A01D 69/025 56/10.2 R |
| 9,181,914 B2* | 11/2015 | Carvignese | ............. | B60K 6/24 |
| 9,346,463 B2* | 5/2016 | Koike | ............. | B60K 6/442 |
| 2007/0056784 A1* | 3/2007 | Joe | ............. | B60K 6/48 180/65.245 |
| 2009/0177345 A1* | 7/2009 | Severinsky | ............. | B60H 1/004 701/22 |
| 2010/0101909 A1* | 4/2010 | Dell | ............. | F16F 15/1232 192/43 |
| 2010/0279816 A1* | 11/2010 | Soliman | ............. | B60K 6/36 477/3 |
| 2010/0286858 A1* | 11/2010 | Otokawa | ............. | B60K 6/365 701/22 |
| 2011/0004363 A1* | 1/2011 | Severinsky | ............. | B60H 1/004 701/22 |
| 2011/0106359 A1* | 5/2011 | Tanaka | ............. | B60K 6/105 701/22 |
| 2011/0184602 A1* | 7/2011 | Severinsky | ............. | B60H 1/004 701/22 |
| 2011/0190971 A1* | 8/2011 | Severinsky | ............. | B60H 1/004 701/22 |
| 2012/0207620 A1* | 8/2012 | Dalum | ............. | B60K 6/12 417/44.1 |
| 2013/0091694 A1* | 4/2013 | Hussain | ............. | B60W 20/00 29/593 |
| 2013/0096745 A1* | 4/2013 | Hussain | ............. | B60W 20/00 701/22 |
| 2013/0096746 A1* | 4/2013 | Hussain | ............. | B60W 10/02 701/22 |
| 2013/0096747 A1* | 4/2013 | Hussain | ............. | B60W 10/06 701/22 |
| 2013/0096748 A1* | 4/2013 | Hussain | ............. | B60W 10/06 701/22 |
| 2013/0096749 A1* | 4/2013 | Hussain | ............. | B60K 6/46 701/22 |
| 2013/0096752 A1* | 4/2013 | Severinsky | ............. | B60H 1/004 701/22 |
| 2013/0096753 A1* | 4/2013 | Severinsky | ............. | B60H 1/004 701/22 |
| 2013/0288835 A1* | 10/2013 | Hauck | ............. | F02B 67/06 474/87 |
| 2013/0328323 A1* | 12/2013 | Reik | ............. | B60K 6/48 290/38 B |
| 2014/0013722 A1* | 1/2014 | Pitcel | ............. | A01D 69/025 56/10.6 |
| 2014/0190426 A1* | 7/2014 | Carvignese | ............. | B60K 6/24 123/2 |
| 2014/0195078 A1* | 7/2014 | Severinsky | ............. | B60H 1/004 701/22 |
| 2014/0257607 A1* | 9/2014 | Van Maanen | ............. | B60W 20/40 701/22 |
| 2015/0112536 A1* | 4/2015 | Severinsky | ............. | B60H 1/004 701/22 |
| 2015/0158483 A1* | 6/2015 | Dalum | ............. | B60K 6/12 701/22 |
| 2015/0175152 A1* | 6/2015 | Dalum | ............. | B60K 6/12 477/3 |
| 2015/0283993 A1* | 10/2015 | Takano | ............. | B60K 6/48 701/22 |
| 2015/0314777 A1* | 11/2015 | Koike | ............. | B60K 6/442 701/22 |
| 2016/0193994 A1* | 7/2016 | Ando | ............. | B60W 20/19 701/22 |

\* cited by examiner

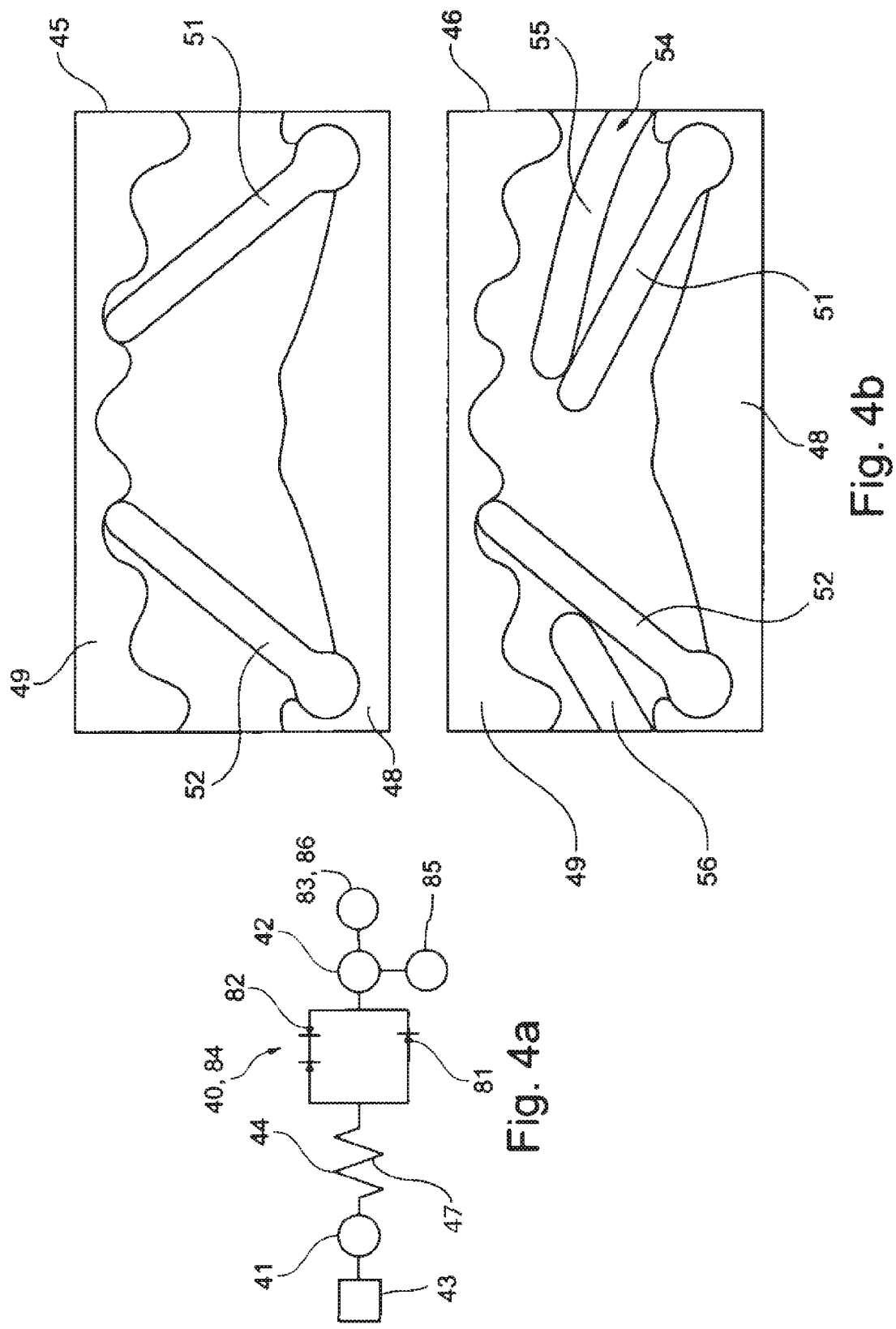

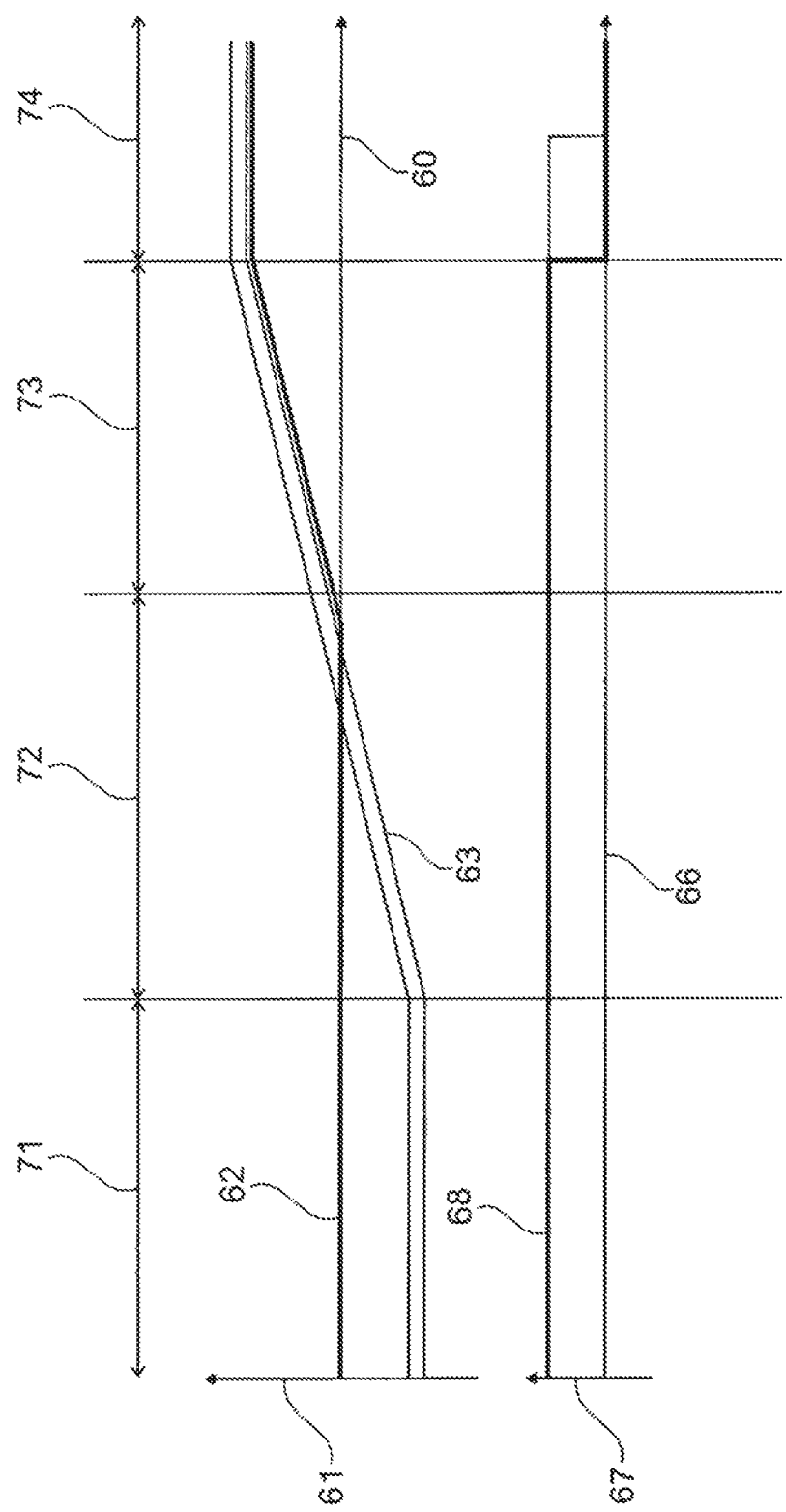

VEHICLE HAVING A BELT PULLEY AND STANDSTILL AIR-CONDITIONING

CROSS-REFERENCE TO RELATED APPLICATIONS

The present application is the U.S. national stage application pursuant to 35 U.S.C. §371 of International Application No. PCT/DE2014/200341, filed Jul. 23, 2014, which application claims priority of German Application No. 10 2013 214 970.0, filed Jul. 31, 2013 and German Application No. 10 2013 221 646.7, filed Oct. 24, 2013.

TECHNICAL FIELD

The invention relates to vehicles including a belt alternator starter (BAS) and an accessory power take-off that can be decoupled, and in particular to a strategy for restarting from stationary air-conditioning operation in combination with a switchable pulley.

BACKGROUND

Vehicles including belt alternator starters are known in the art. They are distinguished by the following features:
a) rigid pulleys including torsional vibration dampers (TVD)
b) pulley decouplers (PYD) including a torsional vibration damper
c) magnetic friction clutches for auxiliary units Only alternative c) allows the operating point of a crankshaft separation to be determined. For reasons of installation space, however, no combination with a pulley decoupler is possible. By means of a friction clutch, the combustion engine is started out of a stationary air-conditioning in a more immediate way as what is referred to as an impulse start.

A disadvantage of the known solutions is that no stationary or stop air conditioning is possible because the belt drive cannot be mechanically decoupled from the crankshaft. The interior temperature rises during start/stop operations and there is a $CO_2$ disadvantage in the case of an early restart of the combustion engine. If magnetic clutches are used, no combination with a PYD is possible.

In vehicles including a belt alternator starter (BAS) and an accessory power take-off that can be decoupled, the belt drive may be operated electrically by an electrical motor (e-motor) when the engine is at a standstill for instance to implement air-conditioning when the engine is switched off or at a standstill. This operating point occurs, for instance, in stop phases at traffic lights or in sailing or coasting mode. A quick re-start of the combustion engine out of this operating condition is imperative.

Friction clutches (for instance magnetic clutches) generally meet this requirement because the rotary speed differences that occur are compensated for by slip, allowing the combustion engine to be started immediately (impulse start). However, these clutches are impossible to be combined with pulley decouplers (PYD) for installation space reasons.

The published German Patent Application DE 10 2011 081 121 A1 discloses a pulley assembly with a system of ramps for decoupling a pulley from a drive shaft when the drive shaft is at a standstill and a means of traction interacting with the pulley is driven counter to the driving direction, in particular with the aid of an electric machine, for instance a starter alternator. The published German Patent Application DE 10 2012 208 318 A1 discloses a belt drive with a crankshaft pulley and a starter alternator. The disclosed solution provides stationary air-conditioning by a reverse rotation of the starter alternator. When the crankshaft is at a standstill or is rotating slowly, for instance in stationary air-conditioning and starting operations, a centrifugal-force clutch is open and does not transmit torque.

SUMMARY

An object of the invention is to provide a solution to the problem of combining an intelligent application strategy on the level of the entire system with a switchable pulley decoupler (SPYD) to allow a quick restart out of the stationary air-conditioning mode without having to use a friction clutch concept. The SPYD consists of a conventional pulley decoupler (PYD) with an additional form-fitting element for separating the crankshaft from the pulley.

The invention provides a restart of the combustion engine at the utmost convenience and the quickest speed while auxiliary units rotate. Upon a restart, two concepts may be applied to couple the auxiliary units to the combustion engine: a frictional connection or a form-fitting (positive) connection. The frictional concept allows the auxiliary units to be coupled even if there is a certain rotary speed difference between the accessory power take-off and the combustion engine. For the form-fitting (positive) connection, there may only be minor rotary speed differences between the accessory power take-off and the combustion engine in order for the two to be recoupled because otherwise the forces would be too high. As a consequence, a form-fitting concept (SPYD, for instance) requires the auxiliary units to be decelerated before they may be recoupled to the combustion engine. The deceleration of the auxiliary units takes a certain time, which may be shortened by additional generating activity by the E-motor. However, since at low speeds, the E-motor can hardly apply torque when in the generator mode, the time required for decelerating the auxiliary units is comparatively long.

A characteristic of an E-motor is that it cannot apply torque if the rotary speed is zero. Yet when the rotary speed is zero, the E-motor has the highest motor torque. This fact may be made use of for a quick restart in that during a stationary air-conditioning mode, the auxiliary units and the E-motor, respectively, are operated in a direction opposite to the direction of regular operation and in a direction opposite to the direction of rotation of the combustion engine, respectively. This has a number of advantages: on the one hand, the E-motor only needs to change polarity once after a restart has been requested and then merely needs to operate as a motor, and on the other hand, during motor operation, the E-motor has the highest torque when the rotary speed is zero. Thus the system is not complex in terms of control technology and the time for decelerating the auxiliary units is minimized. In addition, no impulse-like high torque occurs that might affect the useful life of the pulley, for instance.

The reverse rotation of the auxiliary units at the stationary air-conditioning operating point may optimize the restart of the stationary combustion engine in combination with form-fitting separation concepts with respect to convenience and time.

In an example embodiment, the vehicle includes a switchable pawl freewheel, which includes a switching device and at least one generator pawl that is switchable from a locking position into a freewheel position by means of the switching device. The switching device may be a switching cage, for instance. For example, the pawl freewheel includes an inner ring and an outer ring. When in the locking position, the generator pawl establishes a positive connection between the inner ring and the outer ring in order for them to be fixed against relative rotation.

In an example embodiment, the vehicle includes a switchable pawl freewheel, which includes a boost pawl for locking in a relative direction of rotation opposite that of the generator pawl. The boost pawl thus allows the transmission of torque in a relative direction of rotation opposite the direction of rotation of the generator pawl. The boost pawl is, for example, switched by the same switching device that switches the generator pawl.

In an example embodiment, the vehicle includes a belt alternator starter, which is combined with a pulley decoupler. The pulley decoupler prevents undesired torsional vibration or torque peaks from being introduced into the pulley drive.

In an example embodiment, the vehicle includes a pulley decoupler, which includes a torsional vibration damper. The torsional vibration damper is, for example, embodied as an arc spring damper.

In a method for operating a vehicle including a combustion engine, a belt alternator starter, and a decouplable auxiliary drive for auxiliary units, with at least one air-conditioning compressor and an electric motor usable as a motor and a generator as a belt alternator starter provided in the auxiliary drive as auxiliary units, in particular a vehicle as described above, the object indicated above is alternatively or additionally attained in that the accessory power take-off is coupled and decoupled by means of a form-fitting clutch and in that when the combustion engine is at a standstill during short stop periods, stationary air-conditioning is achieved by a reverse rotation of the auxiliary units and the start of the combustion engine after the stop period is achieved by reversing the direction of rotation of the electric motor.

In an example embodiment, the method includes a boost pawl, which is is overrun in a freewheel-like way during stationary air-conditioning operation. The boost pawl provides an additional boosting function.

In an example embodiment, the polarity of the electric motor that is usable as a belt alternator starter is changed when a start of the combustion engine is requested after the stop period. In combination with a reverse rotation of the auxiliary units, the pole change of the electric motor may result in a particularly smooth response when the combustion engine is started. In addition, the time needed to start the combustion engine may be shortened.

In an example embodiment, when the combustion engine has been started, a generator pawl is switched into its locking position. During normal operation, the generator pawl is in its locking position.

Other advantages, characteristics and details of the invention will become apparent from the following detailed description of various exemplary embodiments with reference to the accompanying drawings.

BRIEF DESCRIPTION OF THE DRAWINGS

The nature and mode of operation of the present invention will now be more fully described in the following detailed description of the invention taken with the accompanying drawing figures, in which:

FIG. 4a is a simplified equivalent circuit diagram of a vehicle of the invention;

FIG. 4b illustrates two rectangles indicating a freewheel during normal operation and during stationary air-conditioning operation; and, FIG. 5 illustrates two Cartesian coordinate diagrams in which a rotary speed and a pawl position are plotted over time.

DETAILED DESCRIPTION

Figure 1:
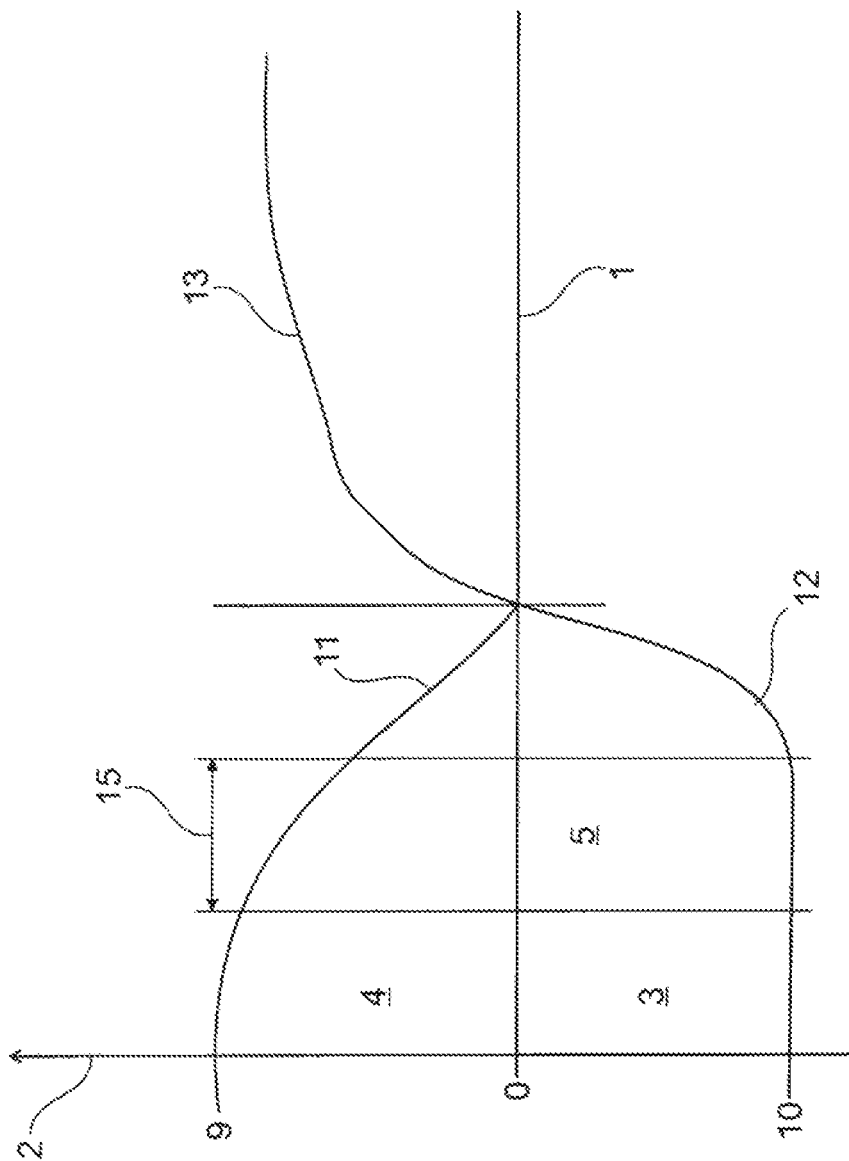
FIG. 1 is a Cartesian coordinate diagram plotting a rotary speed over time to indicate the differences between a conventional stationary air-conditioning operation and a stationary air-conditioning operation in accordance with the invention.

FIG. 1 illustrates a Cartesian coordinate diagram with an x axis 1 and a y axis 2. X axis 1 indicates the time in seconds. Y axis 2 indicates a rotary speed in a suitable unit. A region 3 below x axis 1 represents a stationary air-conditioning operation in accordance with the invention. A region 4 above x axis 1 represents a conventional stationary air-conditioning operation. A region 5 indicates an engine stop phase.

A graph section 11 represents conventional braking due to generator operation. A graph section 12 represents a reverse rotation of the auxiliary units in a stationary air-conditioning operation 3 of the invention. Graph section 11 starts at a positive rotary speed 9. Positive rotary speed 9 may be an idle speed of the combustion engine.

Graph section 12 starts at a negative rotary speed 10. Negative rotary speed 10 may be the negative idle speed. A graph section 13 represents the engine speed of the combustion engine. A double-headed arrow 15 indicates the time saved by the reverse rotation of the auxiliary units in a stationary air-conditioning operation 3 in accordance with the invention.

Figure 2:
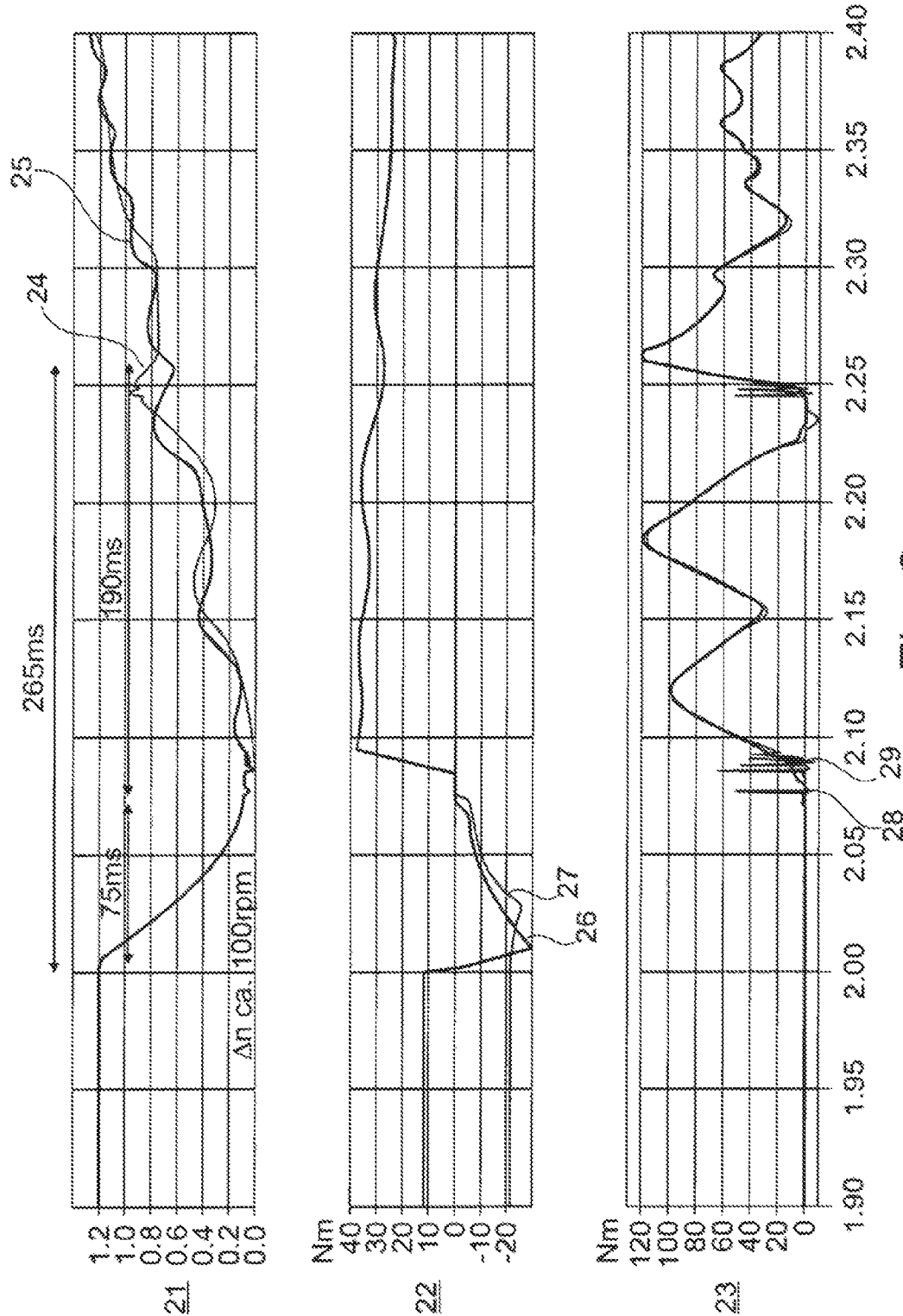
FIG. 2 shows three Cartesian coordinate diagrams in which a conventional starting operation out of a stationary air-conditioning operation is shown.
Figure 3:
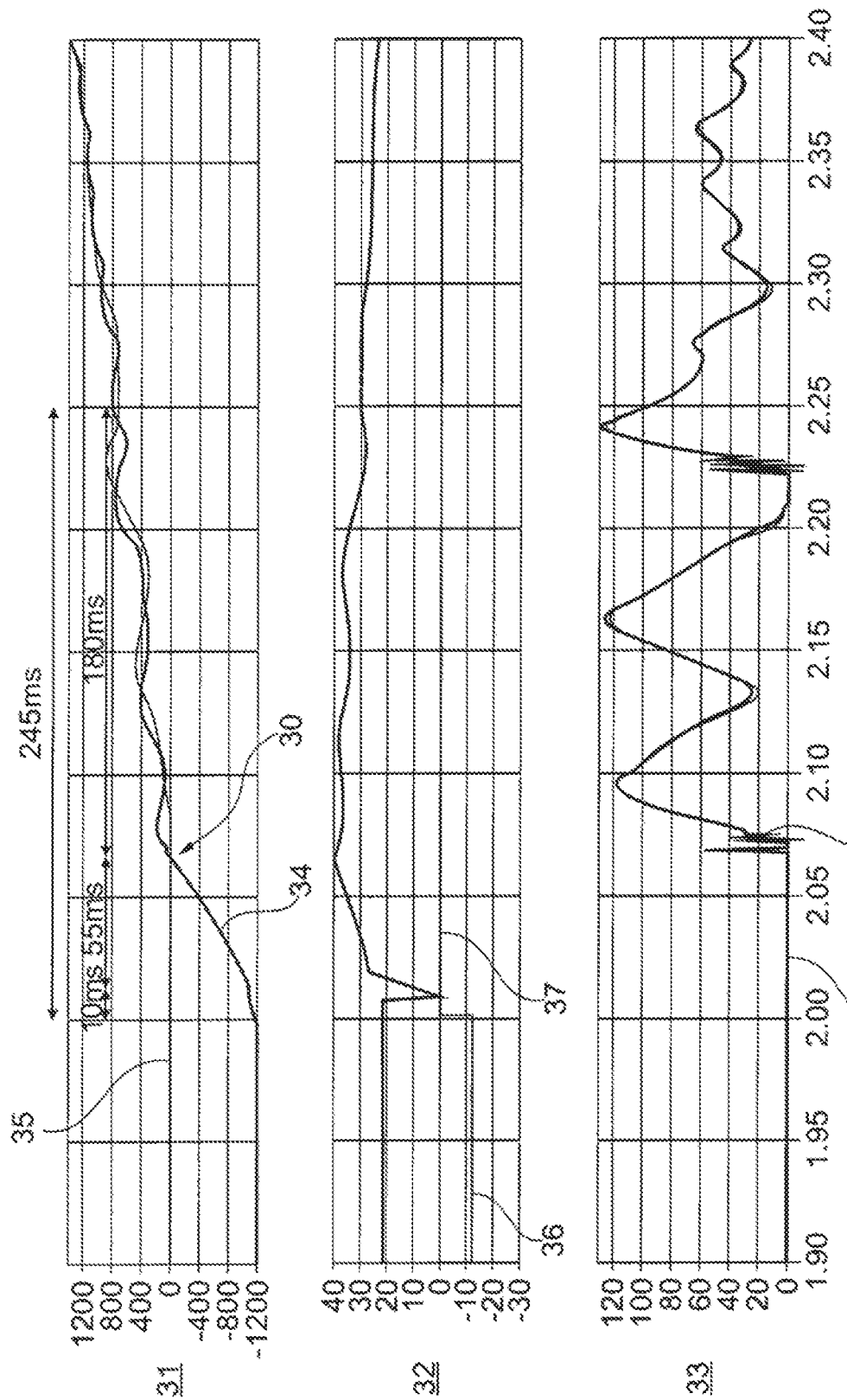
FIG. 3 shows the coordinate diagrams of FIG. 2 in which a starting operation out of a stationary air-conditioning operation as proposed by the invention is shown.

Each of FIGS. 2 and 3 indicate three Cartesian coordinate diagrams 21, 22, and 23; and 31, 32, and 33, respectively, above one another. The x axis in each of coordinate diagrams 21, 22, 23, 31, 32, and 33 indicates the time in seconds. The y axis in each of coordinate diagrams 21 and 31 indicate a rotary speed at a suitable rotary speed unit, for instance times one thousand revolutions per minute. Graphs 24 and 34 indicate the progression of a rotary speed of a crankshaft pulley. Graphs 25 and 35 indicate the progression of a rotary speed of a combustion engine.

The y axis in each of Cartesian coordinate diagrams 22 and 32 indicates torque in Newton meters. Graphs 26 and 36 indicate the progression of torque of a belt alternator starter. Graphs 27 and 37 indicate the progression of torque of an A/C compressor.

The y axis in each of Cartesian coordinate diagrams 23 and 33 indicates torque in Newton meters. Graphs 28 and 38 indicate the torque progression of a pulley decoupler. Graphs 29 and 39 indicate the torque progression of a pawl freewheel. At region 30 of FIG. 3, it can be seen that the reverse rotation of the auxiliary units achieves a smooth response and a minimization of the starting time when the combustion engine is started.

FIG. 4a is a highly simplified representation of coupling device 40 of the invention between crankshaft 41 and pulley 42. Coupling device 40 includes switchable pawl freewheel 81 in combination with form-fitting/positive clutch 82, which may advantageously be represented by freewheels that act in opposite directions. Combustion engine 43 is connected to crankshaft 41. Coupling device 40, in the form of, for example, decouplable accessory power take-off, further comprises air conditioning compressor 85 connected to pulley 42, and belt alternator starter 83 in the form of, for example, electric motor 86, connected to pulley 42.

Pulley decoupler 44 is provided between crankshaft 41 and coupling device 40. Pulley decoupler 44 includes torsional vibration damper 47, which is embodied as an arc spring damper, for instance. Coupling device 40 is used to represent a switchable form-fitting or positive connection with a switchable freewheel.

FIG. 4b represents rectangle 45 indicating normal operation of a switchable pawl freewheel. Rectangle 46 indicates stationary air-conditioning operation of the switchable pawl freewheel. The switchable pawl freewheel includes inner ring 48, which is connectable to a crankshaft so as to be fixed against relative rotation. A pulley decoupler may be provided between the crankshaft and the inner ring of the pawl freewheel. Inner ring 48 of the pawl freewheel is free to rotate relative to outer ring 49.

Outer ring 49 of the pawl freewheel is connected for co-rotation to a belt of a belt drive by at least one belt track. Generator pawl 51 and boost pawl 52 are disposed between inner ring 48 and outer ring 49 of the pawl freewheel. Pawls 51 and 52 are movable/switchable between a freewheel position and a locking position.

Pawls 51 and 52 are switched by switching device 54. Switching device 54 is embodied as a switching cage, for instance, including switching fingers 55 and 56. Switching finger 55 in switching device 54 is associated with generator pawl 51. Switching finger 56 of switching device 54 is associated with boost pawl 52.

During normal operation 45, both generator pawl 51 and boost pawl 52 are in their locking positions, providing a positive, form-fitting connection between inner ring 48 and outer ring 49 of the pawl freewheel. In stationary air-conditioning operation 46, generator pawl 51 is folded in with the aid of switching device 54, in particular with the aid of switching finger 55.

For stationary air-conditioning operation, outer ring 49 moves to the right in rectangle 46. This corresponds to a reversal of the direction of rotation of the belt drive. Boost pawl 56 is overrun in a freewheel-like way, i.e. boost pawl 52 does not transmit torque.

To restart the combustion engine, the direction of rotation is reversed again. For restarting purposes, outer ring 49 moves to the left. Locking boost pawl 52 allows torque to be transmitted between outer ring 49 and inner ring 48. Generator pawl 51 may be coupled in at a later point with the aid of switching device 54. The two pawls 51 and 52 are, for example, pre-loaded into their locking positions, for instance by a spring device.

FIG. 5 illustrates two Cartesian coordinate diagrams above one another. The upper coordinate diagram has an x axis 60 and a y axis 61. X axis 60 indicates a time in seconds. Y axis 61 indicates a rotary speed in revolutions per minute. Dashed line 62 indicates the progression of the rotary speed of the crankshaft. Dual line 63 indicates the progression of the rotary speed of the crankshaft. Dual line 63 indicates the progression of the rotary speed of the pulley.

The lower coordinate diagram has an x axis 66 and a y axis 67. X axis 66 indicates the time in seconds. Y axis 67 indicates the position of the generator pawl (generator pawl 51 in FIG. 4b).

Double-headed arrows 71 through 74 indicate different periods of time. The period of time indicated by double-headed arrow 71 represents a stationary air-conditioning operation. The period of time indicated by double-headed arrow 72 represents start preparations. The period of time indicated by double-headed arrow 73 represents an engine start, i.e. a combustion engine start. The period of time indicated by double-headed arrow 74 indicates a driving operation driven by the combustion engine.

In the periods indicated by double-headed arrows 71 and 72, the rotary speed indicated by dashed line 62 of the crankshaft equals zero, i.e. the combustion engine is at a standstill. In a stationary air-conditioning operation indicated by double-headed arrow 71, the pulley rotates backwards. During the start preparation period indicated by double-headed arrow 72, the pulley is decelerated. Upon an engine start, which is indicated by double-headed arrow 73, the pulley and the crankshaft rotate forwards at the same rotary speed. In the periods indicated by double-headed arrows 71 through 73, generator pawl 68 is in its folded-in position. The generator pawl may be switched after the engine start, which is indicated by double-headed arrow 73, or a little later as indicated by the dashed line.

LIST OF REFERENCE NUMERALS 1 x axis
2 y axis
4 stationary air-conditioning operation
5 motor stop phase
11 graph section
12 graph section
13 graph section
15 double-headed arrow
21 diagram
22 diagram
23 diagram
24 graph
25 graph
26 graph
27 graph
28 graph
29 graph
30 region
31 diagram
32 diagram
33 diagram
34 graph
35 graph
36 graph
37 graph
38 graph
39 graph
40 coupling device
41 crankshaft
42 pulley
43 combustion engine
44 pulley decoupler
45 rectangle
46 rectangle
47 torsional vibration damper
48 inner ring
49 outer ring
51 generator pawl
52 boost pawl
54 switching device
55 switching finger 56 switching finger
60 x axis
61 y axis
62 dashed line
63 dual line
66 x axis
67 y axis
68 line
71 double-headed arrow
72 double-headed arrow
73 double-headed arrow
74 double-headed arrow
81 freewheel
82 positive clutch
83 belt alternator starter
84 decouplable accessory power take-off
85 air conditioning compressor
86 electric motor

What is claimed is:

1. A vehicle comprising:
a combustion engine;
a belt alternator starter; and,
a decouplable accessory power take-off for auxiliary units, wherein the accessory power take-off includes, as auxiliary units, at least an air-conditioning compressor and an electric motor as belt alternator starter that is usable as a motor and as a generator, wherein a coupling and a decoupling of the accessory power take-off occurs by means of a form-fitting clutch, and wherein at a standstill of the combustion engine during a short stop phase, a stationary air-conditioning operation occurs by means of a reverse rotation of the auxiliary units, and wherein a starting of the combustion engine after the short stop phase occurs by means of a reversal of the direction of rotation of the electric motor;
wherein the coupling and the decoupling of the accessory power take-off occurs by means of a switchable pawl freewheel.

2. The vehicle recited in claim 1, wherein the switchable pawl freewheel comprises:
a switching device; and,
at least one generator pawl switchable from a locking position to a freewheel position by means of the switching device.

3. The vehicle recited in claim 2, wherein the switchable pawl freewheel comprises:
a boost pawl that locks in a relative direction of rotation opposite a direction of rotation of the generator pawl.

4. The vehicle recited in claim 1, wherein the belt alternator starter is combined with a pulley decoupler.

5. The vehicle recited in claim 1, wherein a belt decoupler comprises a torsional vibration damper.

6. A method for operating the vehicle recited in claim 1, wherein during the standstill of the combustion engine during the short stop phase, the stationary air-conditioning operation occurs by means of the reverse rotation of the auxiliary units, and wherein the starting of the combustion engine after the short stop phase occurs by means of the reversal of the direction of rotation of the electric motor.

7. The method recited in claim 6, wherein a boost clutch is overrun in a freewheel-like way in the stationary air-conditioning operation.

8. The method recited in claim 6, wherein a polarity of the electric motor, which is usable as a belt alternator starter, is changed when a start of the combustion engine is requested after the short stop phase.

9. The method recited in claim 7, wherein a polarity of the electric motor, which is usable as a belt alternator starter, is changed when a start of the combustion engine is requested after the short stop phase.

10. The method recited in claim 8, wherein a generator pawl is switched to its locking position after the start of the combustion engine.

11. The method recited in claim 9, wherein a generator pawl is switched to its locking position after the start of the combustion engine.

* * * * *